D. H. GOOD.
SELF ADJUSTING TRACTION DEVICE.
APPLICATION FILED MAY 8, 1917.

1,301,554. Patented Apr. 22, 1919.

WITNESSES
James F. Crown

INVENTOR
David H. Good,
BY Richard Bowen,
ATTORNEY

UNITED STATES PATENT OFFICE.

DAVID H. GOOD, OF KANSAS CITY, MISSOURI.

SELF-ADJUSTING TRACTION DEVICE.

1,301,554.　　　　　Specification of Letters Patent.　　Patented Apr. 22, 1919.

Application filed May 8, 1917. Serial No. 167,221.

*To all whom it may concern:*

Be it known that I, DAVID H. GOOD, a citizen of the United States, residing at Kansas City, in the county of Jackson and State of Missouri, have invented certain new and useful Improvements in Self-Adjusting Traction Devices, of which the following is a specification.

My invention relates to a self-adjusting traction device for the wheels of vehicles, particularly tractors, grain binders, headers and other vehicles which may travel at times over soft soil.

I particularly aim to provide an efficient substitute for the customary traction teeth which are usually screwed to the wheel rim and which are necessarily rather wide or stocky and cannot be made slender and prove efficient as there would not be sufficient surface at the heel or attaching end to resist the lateral strain.

The present improvements enable a relatively long and narrow lug or traction member to be used and the invention includes an opening in the wheel rim, a frame for the lug dually reinforcing the rim at the opening, and a spring to normally urge the lug into penetrating engagement with the soft soil but operable to permit retraction of the lug upon contact with hard or firm soil, rocks or other obstructions, and a means for adjusting the tension of the spring employed when desired.

With the above and additional objects, such as will appear as the description progresses, the improvements have been embodied in one preferred form as illustrated in accompanying drawings, wherein:—

Fig. 3 is a sectional view taken through my improvements centrally, and at right angles to the plane on which Fig. 2 is taken and showing the lug retracted.

Figure 1:
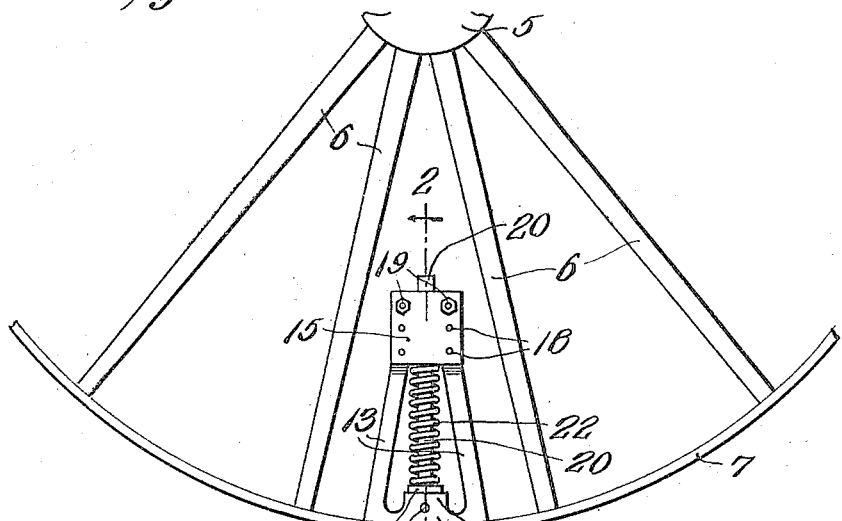
Figure 1 is a fragmentary side elevation of a wheel showing my improvements applied thereto.
Figure 2:
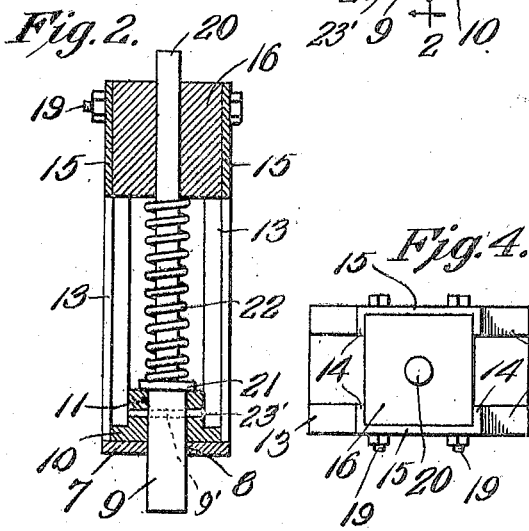
Fig. 2 is a sectional view on the line 2—2 of Fig. 1.
Figure 4:
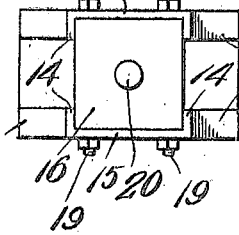
Fig. 4 is a view looking at the top of the improved device.
Figure 3:
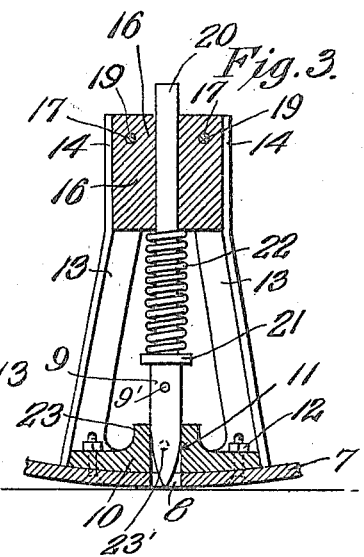

Referring specifically to the drawing, a wheel has been fragmentarily shown in Fig. 1 as comprising a hub 5 from which spokes 6 radiate to a rim 7. My improved device is shown in Fig. 1 as disposed intermediate two of the spokes and connected to the interior of the rim. It is understood, of course, that the device may be of any size preferred and as many of the devices may be used, as desired or conditions may warrant.

Prior to connecting the improvements to the rim 7, a rectangular opening 8 is provided through which a lug or traction tooth 9 slides. The rim 7 is weakened slightly through the provision of the opening 8 and therefore I provide a frame having a shoe 10 completely surrounding the opening and engaging the interior of the rim. The shoe 10 has an opening 11 extending therethrough and in registry with the opening 8.

Any suitable means may be employed to connect the shoe to the rim and for instance such means being the removable bolts shown at 12. Said shoe 10 forms the base of a frame and this frame is completed by upwardly extending bars 13. These bars may be formed integrally with the shoe 10 as shown and throughout a portion thereof extend inwardly both from the sides and ends toward a common center. From the angularly disposed portions, side straight portions 14 are provided. The two pairs of bars 13 are joined by webs 15 which extend at a right angle to portions 14. These portions 14 and webs 15 are integral with sides of the bars as shown. Between the straight portions 14 and webs 15, an adjustable block 16 of iron or other material is disposed.

In the block 16, transverse openings 17 are provided which are adapted to register with openings or apertures 18 arranged in vertical rows in the webs 15. Removable bolts 19 pass through the openings 17 and 18 and serve to secure the block against vertical displacement.

Block 16 has a central vertically disposed opening through which an elongated shank 20, integral with the tooth 9 slides. At the junction of the tooth proper and the shank 20, a flange or shoulder 21 is provided and it may here be mentioned that the parts 9, 20 and 21 are preferably integral with each other. An expansive coiled spring 22 surrounds the shank 20 and at one end bears against the shoulder or flange 21 and at the other end abuts the undersurface of the block 16. This spring 22 is tensioned so as to project the tooth 9 into soft and wet soil but so as to permit the tooth to readily move inwardly upon engaging hard soil, a stone, or another obstruction in the path of travel.

The spring also does not prevent the wheel rim from directly engaging the soil and traveling thereon in the usual manner. Said springs to a certain extent absorb and reduce shocks or jars when traveling over rough hard ground or obstructions and thus promote easy riding.

Particular attention is called to the fact that the shoe 10 has a central vertical extension 23 integral with it, for the particular purpose of additionally reinforcing the rim at the opening 8 and to extend the opening 11 through which tooth 9 slides.

The tension of the spring 22 may be varied by the positioning of the block 16 and the fastening of the bolts 19 in the different openings 18 of the webs 15.

In use, as the wheel travels over hard soil or engages stones or other obstructions, it will move inwardly and the wheel will travel or serve as an ordinary wheel. However, when soft soil is encountered, as when the wheel is mounted on a tractor and it travels over soft soil, the spring 22 will urge the tooth 19 into penetrating engagement with the soil and thus it will serve as a traction tooth or spur and enable the wheel to gain sufficient traction with the ground for proper propulsion of the vehicle.

The invention when used on grain binders or header wheels effects a saving of the crop of wheat or other grain of many acres yearly as the machine may travel over the land without slipping even in soft or wet soil. The wide and thin teeth or lugs are advantageous in the penetration or gripping of the soil as is also the shock absorbing qualities of the spring.

As preferred the device may be built as part of the wheel structure or it may be built as an attachment. When thus built as an attachment, it is only necessary to provide the rim of the wheel with openings for penetration of the bolts 12 and with an opening 8, for each attachment used.

Since merely the preferred embodiment of the invention has been illustrated and described, it is understood that changes in the details of construction may be resorted to within the spirit and scope of the invention.

Cotter pins or other means may be passed through holes 9' and 23' of the spur and extension to maintain the spur projected to serve as an ordinary rigid traction tooth.

I claim:

1. A traction device for a vehicle wheel having a rim provided with an opening, a reinforcing shoe surrounding said opening and secured to the inner surface of the rim, angle bars extending from said reinforcing means and connected in pairs by a web portion, said webs being provided with vertically disposed sets of openings, a block adjustably mounted in the upper end of the angle bars and between the webs, means passing through the webs for securing the block in its adjustment, a traction tooth extending through the reinforcing shoe and the opening in the rim, and a spring engaging the block and traction tooth.

2. A traction device for a vehicle wheel having a rim provided with an opening, a shoe surrounding said opening, and secured to the interior of the rim to reinforce the opening, bars extending from the shoe, said bars terminating in angle portions, and webs, a block slidable intermediate said angle portions and webs and prevented from moving laterally thereby, means engaging the webs and the block to prevent sliding movement of the block, a traction tooth having a shank slidably mounted in said block, abutment means on the tooth, a spring surrounding the shank and engaging the block and abutment means, said shoe having an opening through which the tooth slides, said shoe being extended at the opening to reinforce the opening and provide a longer bearing for the tooth.

In testimony whereof I affix my signature in presence of two witnesses.

DAVID H. GOOD.

Witnesses:
W. C. BARRON,
J. A. MASTERS.

Copies of this patent may be obtained for five cents each, by addressing the "Commissioner of Patents, Washington, D. C."